Aug. 9, 1949.   S. B. CRARY ET AL   2,478,623
REGULATOR FOR SYNCHRONOUS DYNAMOELECTRIC MACHINES
Filed May 6, 1947
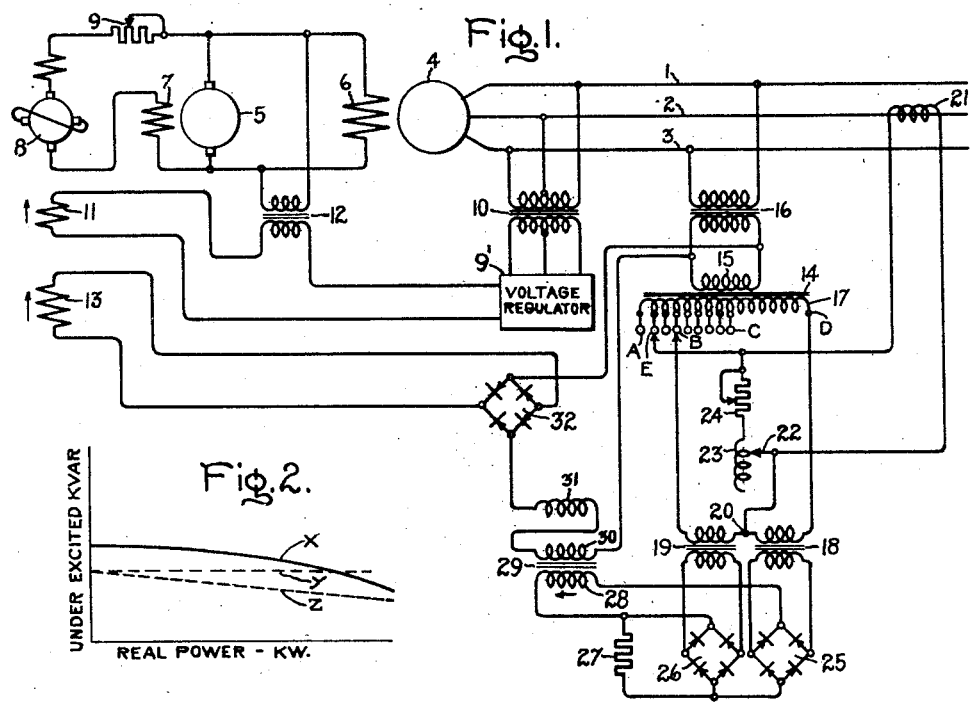
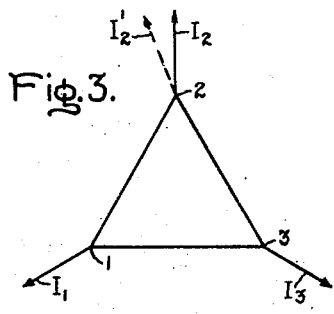
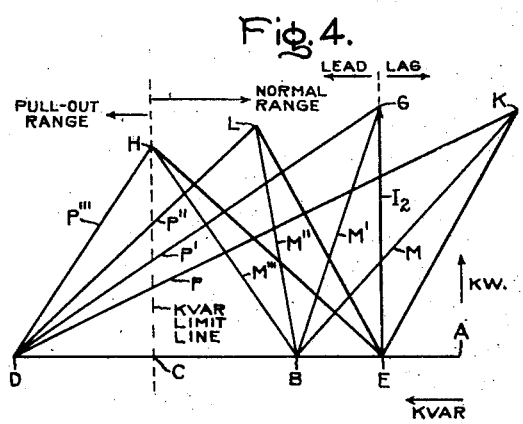
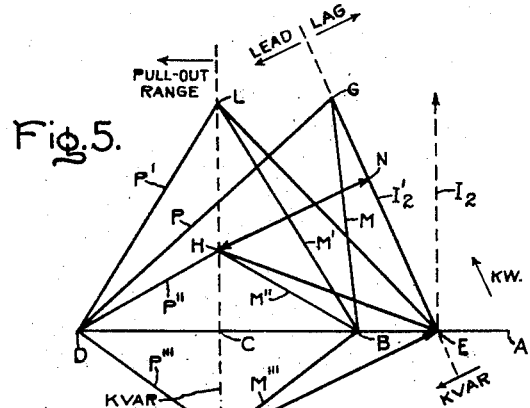
Inventors:
Selden B. Crary,
Melville E. Hartman,
by Powell S. Mack
Their Attorney.

Patented Aug. 9, 1949

2,478,623

UNITED STATES PATENT OFFICE 2,478,623

REGULATOR FOR SYNCHRONOUS DYNAMO-ELECTRIC MACHINES

Selden B. Crary and Melville E. Hartman, Schenectady, N. Y., assignors to General Electric Company, a corporation of New York Application May 6, 1947, Serial No. 746,386

8 Claims. (Cl. 322—20)

Our invention relates to regulator systems for dynamoelectric machines, and more particularly to improvements in excitation control systems for synchronous generators and motors.

In the application of automatic voltage regulating equipment to synchronous generators, the problem of maintaining synchronism of the regulated machine with the interconnected system during system disturbances is of paramount importance. Loss of synchronism may, at times, be traced to the action of the automatic voltage regulator which attempts to maintain constant terminal voltage on the machine during system disturbances or load changes. Some disturbances, such as temporary loss of system load, may cause the generator terminal voltage to rise and the automatic voltage regulator in attempting to reduce the terminal voltage to normal, decreases the generator field to such an extent that the generator loses the requisite synchronizing torque in the underexcited condition, and as a result synchronism may be lost with a consequent loss of system power and further increase in the severity of the system disturbances.

Also, the prime mover for the generator may increase its driving torque due to its governor responding to a change in speed or system loading without a corresponding increase in field excitation, thus in this way resulting in loss of synchronism.

In accordance with our invention, we have found it desirable to modify the action of the conventional automatic voltage regulators by providing a separate lower field excitation limit control which becomes operative at a predetermined point to prevent generator field excitation from being reduced to a value where instability and loss of synchronism of the generator and the interconnected system will result.

It is, therefore, an object of our invention to provide an improved regulating system for alternating current dynamoelectric machines.

It is another object of our invention to provide an improved automatic excitation control system for synchronous generators and motors.

It is a further object of our invention to provide improved field excitation controlling means for preventing the lowering of field excitation on synchronous generators below the level required for machine and system stability.

Another object of our invention is the provision of a field excitation lower limit for synchronous machines which is based on armature electrical quantities of the regulated machine and therefore independent of the condition of the governor or prime mover throughout the normal range of machine load.

In studying the problem of satisfactory lower limit of field excitation control for synchronous machines, we have found that in a synchronous generator the value of reactive kva. at pullout is substantially constant and independent of the real power load being carried by the machine, assuming that the generator is connected to a system of negligible external impedance. When the system has external impedance, the value of reactive kva. at pullout decreases slightly, with increasing real power load. Since this value of reactive kva at pullout does not change appreciably with the generator power, we have found that a suitable lower limit control, operative in response to the value of reactive kva. in the generator, may be easily applied, thereby eliminating the necessity for modifying the lower excitation limit of the automatic voltage regulator in response to prime mover load or governor position of the generator prime mover. In addition, since the limit is based on generator armature quantities and not on any function of field excitation current or voltage, no compensation is required for changes in field resistance due to heating, as is customarily required in regulators having lower limits based on generator field voltage or current.

Our invention will be better understood from the following description taken in connection with the accompanying drawing, and its scope will be pointed out in the appended claims. In the drawing, Fig. 1 illustrates diagrammatically an embodiment of our invention as applied to a three-phase synchronous generator interconnected with an external power system; Fig. 2 illustrates certain of the relationships existing between real power and reactive kva. in the system of Fig. 1, and Figs. 3, 4, and 5 are vector diagrams useful in explaining the operation of the system of Fig. 1.

Referring now to the drawing, there is shown a three-phase A.-C. power system having line conductors 1, 2, and 3, respectively, connected to the armature of the synchronous generator 4. A direct current exciter 5, which may be either direct connected or separately driven, is arranged to supply field excitation current to the field winding 6 of the synchronous generator. The output of the direct current exciter 5 is varied by controlling the energization of its field winding 7 by means of the amplidyne exciter 8, which may also be separately driven or direct connected to the main generator or main exciter set. A variable resistance 9 is provided in series with the amplidyne 8 and generator field 7 for adjusting amplidyne voltage under regulator control and adjusting exciter voltage under manual control. For controlling the output of the amplidyne 8, and consequently the energization of the main generator field winding 6, a conventional voltage regulator 9 is provided which, as shown, is responsive to the voltages existing across all three phases of the main generator 4 through the three-phase potential transformer 10. Thus the voltage regulator, which may include a positive phase sequence network (not shown), is responsive to three-phase voltages and produces a direct current control voltage for energizing the control field 11 of the amplidyne 8 with a variable current for effecting the required change in the field excitation of the main generator. In order to prevent hunting of the amplidyne control field circuit, a stabilizing transformer 12 may be provided for suppressing oscillations or hunting between the voltage regulator control system and the generator field circuit.

The system as thus far described is entirely conventional and will operate to maintain generator voltage at the desired predetermined value irrespective of the load, either real or reactive, on the main generator 4. Thus, in the event of a system change, the generator voltage 4 may tend to rise, and the action of the voltage regulator and associated circuit will be to reduce the excitation of the amplidyne 8 in an attempt to reduce field excitation and terminal voltage of the main generator 4. If a lower limit of excitation is not provided, this field lowering action will continue until the field excitation of the main generator is weakened to a point where synchronizing torque is lost and the main generator may pull out of synchronism with the interconnected system.

In order to insure that field excitation is not lowered to this dangerous level, a lower limit is provided which consists of the second control field 13 for the amplidyne arranged to be energized only when the main generator 4 is approaching pullout conditions as indicated by the amount of reactive kva. being supplied by the generator. As shown in Fig. 2, the solid line $x$ represents the reactive kva. at pullout of the generator for various quantities of real power. This is representative of the usual power system in which the generator is connected to an external circuit having appreciable impedance. The dotted line $y$ represents the reactive kva. limit which is not compensated for external impedance, and the dotted line $z$ is representative of the reactive kva. limit which we embody in this invention and which is compensated for external impedance, thereby giving a limiting value of reactive kva. that approximates closely, but is always slightly less than the maximum value at pullout for all values of real power load on the generator.

The circuit for measuring reactive kva. and obtaining the desired limiting characteristics, as shown by the curve $z$ in Fig. 2, consists of the transformer 14 having a primary winding 15 which is energized through the potential transformer 16 from the main line conductors 1 and 3 of the main generator 4. The secondary winding 17 of the transformer 14 is provided with a plurality of taps such as A, B, C, D and E. In the illustration shown, the points B and D are connected to opposite ends of the primaries of two series connected isolating transformers 18 and 19. Connected between tap E and the midpoint 20 of the primary windings of the transformers 18 and 19 is a circuit consisting of resistor 24 and reactor 23 connected in series. Current transformer 21 placed in line 2 of the generator has its output connected across this resistor-reactor combination. The resistor in conjunction with the tap E selected on transformer 14 determines the reactive kva. limit, and the adjustable tap 22 on the recalibrating reactor 23 is employed for compensating the reactive kva. measuring circuit for impedance in the external connected system. The secondary windings of the transformers 18 and 19 are connected to the input terminals of a pair of full wave rectifier bridges 25 and 26, respectively. It will be seen that the rectifier bridges 25 and 26 have their outputs connected in parallel and with opposing polarity, having in series therewith the saturating winding 28 of the saturable reactor 29. A bypass resistor 27 is placed across the ouput of the rectifier bridge 26 to permit the passage of current in the saturating winding in one direction only. Thus, when the voltage on the output of rectifier 25 exceeds that of rectifier 26, direct current will flow through the saturating winding 28 in the direction shown by the arrow alongside this winding and through the resistor 27 back to the negative terminals of the rectifiers. In the other case, when the voltage of the rectifier 26 is greatest, no current will flow through the saturating winding 28 due to the blocking action of the rectifier 25 but the output current of rectifier 26 will flow through the resistor 27 back to the negative terminal of the bridge 26. The alternating current windings 30 and 31 of the saturable reactor 29 act as a variable impedance in the supply circuit for the limit control field winding 13 since the windings 30 and 31 are placed in series with the input terminals of the rectifier bridge 32. Any convenient source of A.-C. power may be used to energize the bridge 32, and we have shown the power source for the bridge 32 as being taken from the secondary side of the transformer 16, thereby insulating all of the control circuits from the high voltage generator power circuits. The output of the rectifier 32 is utilized to energize the lower limit field winding 13 of the amplidyne in a manner which will become apparent further on in this description.

During normal operation of the regulating system, the impedance of the windings 30 and 31 of the saturable reactor is maintained at a high value since negligible current is flowing in the winding 28, with the result that no appreciable voltage is applied to the rectifier bridge 32; consequently, there is slight, if any, energization of the control field winding 13. However, upon an unbalance in the rectifier bridges 25 and 26, so that the voltage output of the bridge 25 exceeds that of the bridge 26, direct current flows through the saturating winding 28 thereby decreasing the impedance of the saturable reactor and permitting increased voltage to be applied to the rectifier bridge 32, whereupon the energization of the control field winding 13 is effected, and increased excitation is applied to the amplidyne to prevent the further reduction in amplidyne output due to the decreasing excitation of the control field 11 through normal action of the voltage regulator 9.

The operation of the system will be best understood by reference to the vector diagrams of Figs. 3, 4, and 5. Fig. 3 illustrates the vector relationship of voltages appearing on the main generator conductors 1, 2 and 3 and also shows the relationship of line currents $I_1$, $I_2$ and $I_3$ existing under conditions of unity power factor on the generator 4. The current vector I₂ also illustrates the vector position of the current flowing through the resistor 24 as energized by the current transformer 21 at unity power factor. The dotted vector I'₂ shows the vector position of the voltage existing across the resistance 24-reactance 23 combination at unity power factor.

Referring now to Fig. 4, operation is shown corresponding to the conditions represented by the dotted line y in Fig. 2 in which no external impedance is present in the generator output circuit; consequently, the compensating reactance 23 has been eliminated from the current transformer circuit of Fig. 1. In Fig. 4 the base line A—D represents the vector position of the secondary voltage on the transformer 14. The points E, B and C are representative of the voltages appearing at the corresponding taps on the secondary winding of the transformer 14. Under conditions of unity power factor, the voltage across the resistor 24 is represented by the vector E—G, this line, therefore, becoming the reference line for unity power factor and real power, and the quadrant to the right thereof representing lagging power factors and that to the left representing leading power factors. The area to the right of the dotted line C—H is, therefore, the normal operating range of the machine under all power factor conditions. The area to the left of line C—H represents generator operation in the critical underexcited or pull-out range. The line C—H may, therefore, be termed the reactive kva. limit line and by selection of the proper tap E on the transformer 14 may be varied to the right or left, depending on the characteristics of the machine it is desired to control. From this diagram, taken in connection with the circuit of Fig. 1, it will be seen that the points K, G, L and H represent various conditions of operation of the generator from lagging power factor, through unity, to leading power factor and up to the reactive kva. limit line C—H. These points are determined by the vector resultant of the voltages combining to produce the voltages appearing across the primaries of the transformers 18 and 19. Thus, the vectors M, M', M" and M'" represent the voltage impressed on the primary winding of the transformer 18, and are the vector additions of the voltage between the taps B and E on the transformer secondary winding 17, and the voltage across the current measuring circuit, that is the resistor 24. Thus, the D.-C. output voltage of the rectifier 25 is proportional to the magnitude of this vector M. Similarly, the vectors P, P', P" and P'" are representative of the voltage impressed on the primary of the transformer 19, and are the vector additions of the voltage between the taps D and E on transformer secondary winding 17 and the voltage across the resistor 24. The D.-C. output of the rectifier bridge 26 is thus proportional to the magnitudes of this vector P.

From this it will be noted that for all conditions of operation illustrated at the right of the limit line C—H, the vectors P, P', P" and P'" are greater than or equal to the magnitude of their corresponding vectors M, M', M" and M'". This is equivalent to the condition previously mentioned wherein the output voltage of the rectifier 26 exceeds or is equal to that of the rectifier 25. Consequently, there is negligible current flow in the saturation winding 28 and the lower limit control field 13 is substantially de-energized. If, however, the voltage regulator attempts to further lower excitation, the vector representing current in line I₂ will tend to swing farther to the left passing the point H and crossing the limit line, and as soon as this action has taken place it will be noted that the M vector will be greater in magnitude than the corresponding P vector. This results in an increase in voltage output of the rectifier 25 over the output of rectifier 26, and the flow of direct current in the saturating winding 28 of the reactor 29 with a resultant current flow in the lower limit control field winding 13. Energization of the field winding 13 is in a direction to raise the amplidyne voltage and consequently prevent the main generator field excitation from being lowered any further. The circuit as thus described effectively prevents the generator field excitation from being lowered beyond that value required for machine stability, thereby preventing pullout or loss of synchronism of the main generator.

The circuit without the compensating reactance 23 and as described in connection with Fig. 4 will, therefore, operate to hold a constant reactive kva. limit in accordance with the dotted line y of Fig. 2. If it is desired to compensate for external impedance and provide a drooping characteristic to the reactive kva. limit as represented by the line z in Fig. 2, reactance 23 is inserted in series with the resistance 24 in the current transformer circuit, and the resulting operation is as illustrated by the vector diagram, Fig. 5.

In this case, the vector I'₂ has shifted into the leading quadrant, thereby representing the voltage drop appearing across the resistor 24-reactance 23 combination, and the locus of the line E—G then becomes the unity power factor line of the regulating circuit. In Fig. 5, the line E—F which is perpendicular to E—G represents zero power factor or corresponding to a condition of no real load on the generator, and as in Fig. 4 the real power component of current being delivered by the generator is measured along the line E—G. The action of the regulating circuit is the same as it will be seen that the voltages M, M', M" and M'" for conditions of operation to the right of or on the limit line are less than or equal to the magnitude of the corresponding voltages P, P', P" and P'" impressed across the primary of the transformer 19. Thus as soon as there is an action on the part of voltage regulator 9 to reduce field excitation, thereby resulting in an increase in power factor angle leading, the vector I'₂ will swing beyond the limit line C—H and in so doing the voltage represented by the M vectors will exceed that represented by the corresponding P vectors, resulting in the output of rectifier 25 exceeding that of rectifier 26, with consequent energization of the lower limit control field winding 13 as previously described in connection with Fig. 4.

The operation as described in connection with Fig. 5, therefore, follows the characteristic z in Fig. 2, with the result that reactive kva. limit decreases with increase in real power. For example, in Fig. 5 the distance E—F represents the reactive kva. limit at zero power, whereas the distance H—N represents the reactive kva. limit held corresponding to the real power value as represented by the distance E—N. As the real power increases along the line E—G, it will be noticed that the reactive kva. limit maintained is in all cases the distance measured along a line parallel with E—F and between the unity power factor line E—G and the reactive kva. limit line.

From the foregoing, it will be seen that our invention provides means for placing a definite limit on the lower range of excitation of a synchronous machine and effective in response to armature quantities of the machine, and which operates independently of any external adjustment and also eliminates the requirement for compensation for heating and resistance changes so frequently required in lower limit controls which operate in conjunction with the generator field circuit.

While we have shown and described our invention as applied to a particular system embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. A regulating system for a synchronous alternating current dynamoelectric machine having a field winding comprising, excitation means for said field winding, automatic regulating means for controlling said field excitation means, reactive kilovolt-amperes responsive means responsive to a predetermined value of reactive kilovolt-amperes in said dynamoelectric machine, and means controlled by said reactive kilovolt-amperes responsive means for limiting the field excitation reducing action of said regulating means, said last named controlled means including a compensating element for inversely varying the maximum value of reactive kilovolt-amperes with the value of said power in said machine.

2. A regulating system for a synchronous alternating current dynamoelectric machine having a field winding comprising, a source of energy for exciting said field winding, automatic means responsive to machine terminal voltage for varying said field winding energization to maintain said machine voltage constant, reactive kilovolt-amperes responsive means responsive to a predetermined value of reactive kilovolt-amperes in said dynamoelectric machine below a predetermined maximum value of reactive kilovolt-amperes at which said machine pulls out of synchronism, and means controlled by said reactive kilovolt-amperes responsive means for controlling said field excitation means to maintain said machine field excitation at least as high as a predetermined value.

3. An automatic regulating system for a synchronous dynamoelectric machine having an armature and a direct current field winding comprising, a dynamoelectric exciter for controlling the excitation of said field winding, a pair of control elements for said exciter, means responsive to the terminal voltage of said machine for variably energizing one of said control elements to raise or lower said field winding excitation, reactive power responsive means responsive to a predetermined value of reactive power in said dynamoelectric machine below a predetermined maximum value of reactive power at which said machine pulls out of synchronism, and means controlled by said reactive power responsive means for energizing the second of said control elements to limit the excitation lowering action of said first control element to a predetermined minimum excitation for said machine.

4. An automatic regulating system for a synchronous dynamoelectric machine having an armature and a direct current field winding comprising, a dynamoelectric exciter for supplying excitation to said field winding, first control means responsive to the terminal voltage of said machine for controlling said exciter to maintain constant the terminal voltage of said machine, second control means for said exciter for preventing reduction in generator excitation below a predetermined value, and means responsive to the reactive power in said machine armature with respect to a predetermined maximum reactive power in said machine armature at which said machine pulls out of synchronism for energizing said second control means.

5. An automatic regulating system for a synchronous dynamoelectric machine having an armature and a direct current field winding comprising, a dynamoelectric exciter for supplying excitation to said field winding, first control means responsive to the terminal voltage of said machine for controlling said exciter to maintain constant the terminal voltage of said machine, second control means for said exciter, and reactive power responsive means for energizing said second control means, said reactive power responsive means being responsive to a predetermined value of reactive power in said armature under synchronous conditions below a predetermined maximum value at which said machine pulls out of synchronism for controlling the energization of said second control means so as to maintain the excitation of said machine at a predetermined value.

6. An automatic regulating system for a synchronous dynamoelectric machine having a direct current field winding comprising, an amplidyne exciter for controlling the excitation of said field winding, first excitation winding current supply means responsive to the terminal voltage of said machine for controlling said exciter to maintain constant the terminal voltage of said dynamoelectric machine, reactive power responsive means for selecting a particular value of reactive power, and second excitation winding current supply means responsive to said reactive power responsive means for limiting the exciter controlling action of said first current supply means.

7. A field excitation system for a synchronous alternating current generator comprising, in combination, an alternating current generator having a field winding, a direct current exciter connected to supply said field winding with direct current, field excitation means for said exciter, means responsive to the terminal voltage of said generator for supplying current to said field exciter means so as to maintain constant said generator terminal voltage, and reactive power responsive means connected to said generator and responsive to a predetermined value of reactive power in said generator below a maximum reactive power at pull out conditions, said reactive power sensitive means including means for compensating for external impedances, and limit excitation current supply means connected to said reactive power responsive means and controlled thereby to supply current to said field excitation means when the reactive power in said generator reaches said predetermined value, said limit excitation means thereby maintaining the field excitation of said generator above a predetermined level.

8. A field excitation control system for a synchronous alternating current generator comprising, in combination, an alternating current generator having a field winding, a direct current exciter connected to supply said field winding with direct current, field excitation means for said exciter, regulator means responsive to the terminal voltage of said generator for supplying current to said field excitation means to maintain constant said generator terminal voltage, reactive power responsive means connected to said generator, said reactive power responsive means including means for compensating for external load impedances, and limit excitation current supply means for said field excitation means connected to said reactive power responsive means for supplying current to said field excitation means so as to maintain said field excitation at a predetermined minimum value, said limit excitation means including a variable impedance element for controlling the flow of current to said field excitation means when the reactive power in said generator reaches a predetermined selected value.

SELDEN B. CRARY.
MELVILLE E. HARTMAN.

REFERENCES CITED

The following references are of record in the file of this patent:

UNITED STATES PATENTS

| Number | Name | Date |
| --- | --- | --- |
| 2,367,930 | Crary | Jan. 23, 1945 |
| 2,389,364 | Jenks | Nov. 20, 1945 |
| 2,412,442 | Crever et al. | Dec. 10, 1946 |